US010798285B2

(12) United States Patent
Yasutomi

(10) Patent No.: US 10,798,285 B2
(45) Date of Patent: Oct. 6, 2020

(54) IMAGE PROCESSING APPARATUS, METHOD, AND MEDIUM TO PERFORM ALIGNMENT OF A PLURALITY OF IMAGES BASED ON CONVERSION COEFFICIENT WHILE FINELY MOVING AN IN-FOCUS POSITION

(71) Applicant: CANON KABUSHIKI KAISHA, Tokyo (JP)

(72) Inventor: Takeshi Yasutomi, Hino (JP)

(73) Assignee: Canon Kabushiki Kaisha, Tokyo (JP)

(*) Notice: Subject to any disclaimer, the term of this patent is extended or adjusted under 35 U.S.C. 154(b) by 79 days.

(21) Appl. No.: 16/162,961

(22) Filed: Oct. 17, 2018

(65) Prior Publication Data
US 2019/0141231 A1 May 9, 2019

(30) Foreign Application Priority Data
Nov. 8, 2017 (JP) ................. 2017-215913

(51) Int. Cl.
H04N 5/232 (2006.01)
G03B 13/32 (2006.01)
H04N 5/235 (2006.01)
G03B 13/36 (2006.01)

(52) U.S. Cl.
CPC ......... H04N 5/23212 (2013.01); G03B 13/32 (2013.01); G03B 13/36 (2013.01); H04N 5/2356 (2013.01); H04N 5/23232 (2013.01); H04N 5/23248 (2013.01)

(58) Field of Classification Search
CPC .......... H04N 5/23212; H04N 5/23232; H04N 5/23248; H04N 5/2356; G03B 13/32; G03B 13/36
See application file for complete search history.

(56) References Cited

U.S. PATENT DOCUMENTS

| 6,456,731 B1* | 9/2002 | Chiba | G06T 7/33 382/107 |
| 8,023,000 B2* | 9/2011 | Tamaru | G03B 13/32 348/222.1 |
| 2005/0093987 A1* | 5/2005 | Hatanaka | H04N 5/23248 348/208.99 |
| 2008/0037881 A1* | 2/2008 | Murashita | H04N 5/232 382/232 |

FOREIGN PATENT DOCUMENTS

| JP | 10-290389 A | 10/1998 |
| JP | 2008-271240 A | 11/2008 |

* cited by examiner

Primary Examiner — Luong T Nguyen
(74) Attorney, Agent, or Firm — Canon U.S.A., Inc. IP Division

(57) ABSTRACT

To enhance the accuracy of a conversion coefficient detected from a plurality of images captured while finely moving an in-focus position, an image processing apparatus includes a detection unit configured to detect feature points from a plurality of images having different in-focus positions, and a combining unit configured to calculate a conversion coefficient for alignment using the feature points and perform combining processing based on the conversion coefficient. The combining unit calculates a conversion coefficient of a second image in the plurality of images with respect to a first image in the plurality of images based on a conversion coefficient calculated using the feature points detected from the first image and a third image in the plurality of images.

14 Claims, 7 Drawing Sheets

IMAGE PROCESSING APPARATUS, METHOD, AND MEDIUM TO PERFORM ALIGNMENT OF A PLURALITY OF IMAGES BASED ON CONVERSION COEFFICIENT WHILE FINELY MOVING AN IN-FOCUS POSITION

BACKGROUND

Field of the Disclosure

The present disclosure generally relates to image processing and, more particularly, to an image processing apparatus, an image pickup apparatus, a control method, and a storage medium that performs alignment of a plurality of images.

Description of the Related Art

In capturing an image of a plurality of objects positioned at greatly different distances from an image capturing apparatus, such as a digital camera, or in capturing an image of an object that is long in a depth direction, only a part of the object may be able to be in focus due to an insufficient depth of field of the image capturing apparatus. To solve such a problem, Japanese Patent Application Laid-Open No. 10-290389 discusses a focus stacking technique for capturing a plurality of images at different in-focus positions, extracting only in-focus areas from the images, and combining the in-focus areas into an image to generate a combined image in which the entire imaging area is in focus. An accurate alignment between images is indispensable for accurately performing the focus stacking technique. Japanese Patent Application Laid-Open No. 2008-271240 discusses a method for detecting and tracking feature points in a plurality of images, obtaining a conversion coefficient using the detected feature points, performing alignment of the images based on the conversion coefficient, and then combining the images.

In order to obtain a combined image with a high quality in the case of creating a focus stacked image by the method discussed in Japanese Patent Application Laid-Open No. 10-290389, it is preferable to capture a large number of images while finely changing the in-focus position. However, if the amount of change of the in-focus position is small, even when a conversion coefficient for alignment is to be obtained by the method discussed in Japanese Patent Application Laid-Open No. 2008-271240, the movement amount of the feature point is smaller than a threshold value, which may make it difficult to obtain the accurate conversion coefficient.

SUMMARY

The present disclosure generally relates to an image processing apparatus that accurately performs alignment of a plurality of images captured while finely moving an in-focus position.

According to one or more aspects of the present disclosure, an image processing apparatus includes at least one memory configured to store instructions and at least one processor in communication with the at least one memory and configured to execute the instructions to detect feature points from a plurality of images having different in-focus positions, calculate a conversion coefficient for alignment of at least a part of the plurality of images by using the feature points, and perform combining processing on at least a part of the plurality of images based on the conversion coefficient. The image processing apparatus may calculate, in a case where a conversion coefficient of a second image in the plurality of images with respect to a first image in the plurality of images, which is calculated using the feature points detected from the first image and the second image, does not satisfy a predetermined condition and in a case where a conversion coefficient of a third image in the plurality of images with respect to the first image, which is calculated using the feature points detected from the first image and the third image, satisfies the predetermined condition, the conversion coefficient of the second image based on the conversion efficient of the third image.

Further features of the present disclosure will become apparent from the following description of exemplary embodiments with reference to the attached drawings.

DESCRIPTION OF THE EMBODIMENTS

Various exemplary embodiments, features, and aspects of the present disclosure will be described in detail below with reference to the accompanying drawings.

Figure 1:
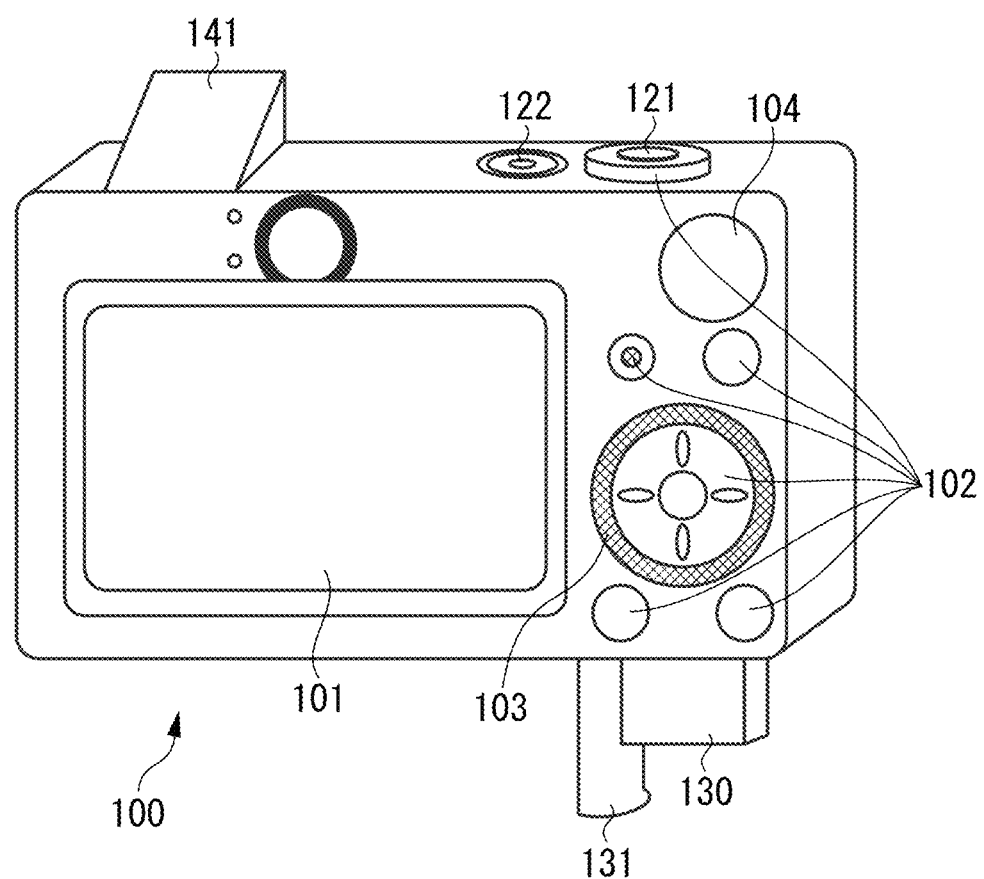
FIG. 1 is a rear perspective view illustrating a schematic configuration of a digital camera according to an exemplary embodiment of the present disclosure.

FIG. 1 is a rear perspective view illustrating a schematic configuration of a digital camera as an image processing apparatus according to an exemplary embodiment of the present disclosure.

A first exemplary embodiment will be described below. On a rear surface of a digital camera 100, a display unit 101 and an operation unit 102 are provided. The display unit 101 displays images and various information. The operation unit 102 includes operation members, such as various switches and buttons, which receive various operations from a user. On the rear surface of the digital camera 100, a mode selection switch 104 and a controller wheel 103 are also provided. The mode selection switch 104 is used to switch an image capturing mode and the like. The controller wheel 103 can be rotatably operated. On an upper surface of the digital camera 100, a shutter button 121, a power switch 122, and a flash 141 are provided. The shutter button 121 is used to instruct image capturing. The power switch 122 switches ON/OFF of a power supply of the digital camera 100. The flash 141 irradiates an object with flash light.

The digital camera 100 is connectable to an external apparatus via wired or wireless communication and is capable of outputting image data (still image data and moving image data) to the external apparatus. On a lower surface of the digital camera 100, a storage medium slot (not illustrated) which can be opened and closed with a lid 131 is provided. A storage medium 130, such as a memory card, can be inserted into or removed from the storage medium slot.

The storage medium 130 stored in the storage medium slot may be a recording medium and can communicate with a system control unit 210 (see FIG. 2) of the digital camera 100. The storage medium 130 is not limited to a memory card or the like that can be inserted into or removed from the storage medium slot, but instead may be an optical disk or a magnetic disk such as a hard disk, or the like. The storage medium 130 may be incorporated in the main body of the digital camera 100.

Figure 2:
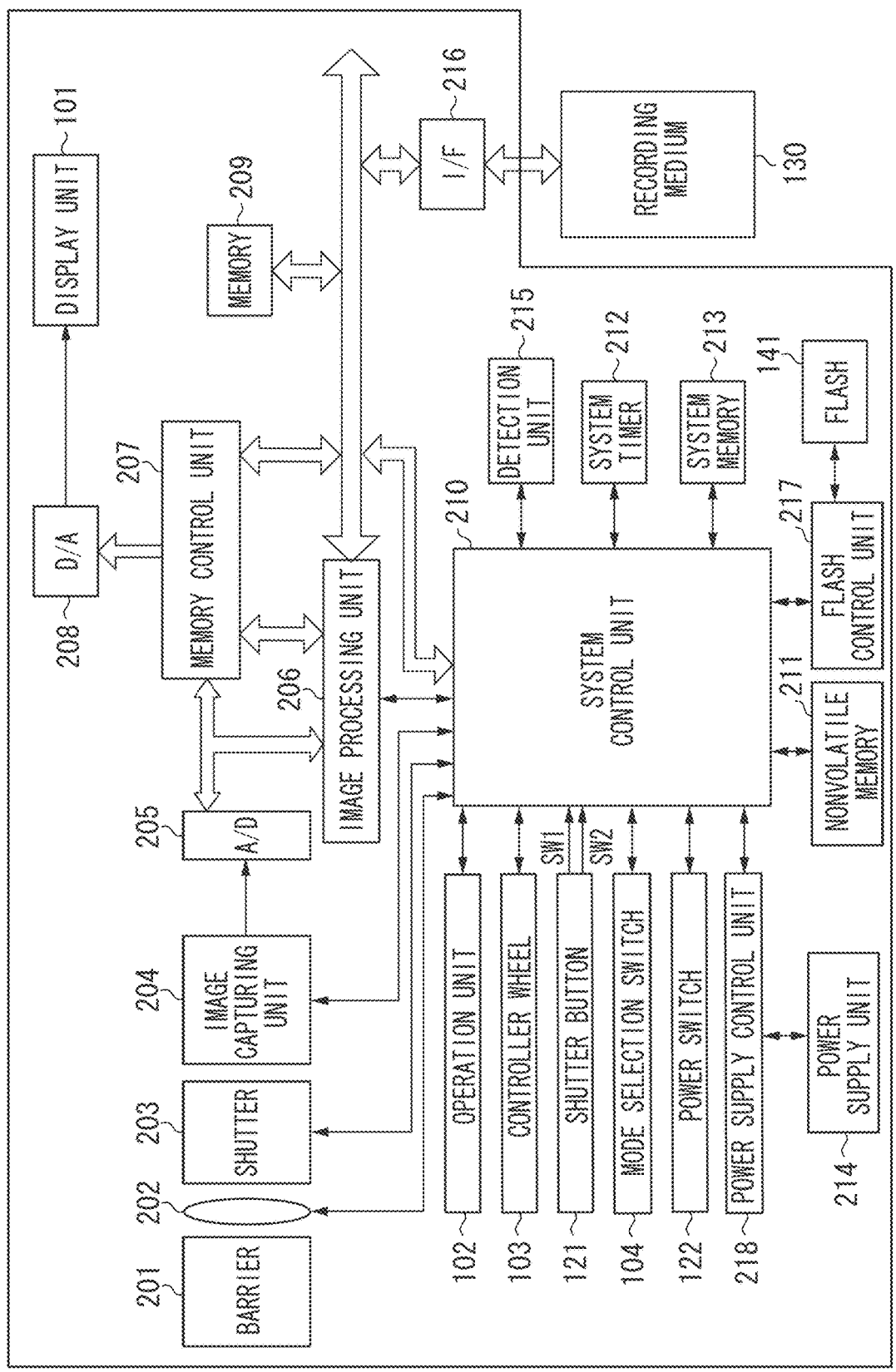
FIG. 2 is a block diagram illustrating a hardware configuration of the digital camera according to an exemplary embodiment of the present disclosure.

FIG. 2 is a block diagram illustrating a hardware configuration of the digital camera 100. The digital camera 100 includes a barrier 201, an imaging lens 202, a shutter 203, and an image capturing unit 204. The barrier 201 covers an image capturing optical system, thereby preventing contamination and breakage of the image capturing optical system. The imaging lens 202 includes a lens group including a zoom lens and a focus lens and constitutes the image capturing optical system. The shutter 203 includes an aperture function and adjusts the amount of exposure to the image capturing unit 204. The image capturing unit 204 is an image sensor that convers an optical image into an electric signal (analog signal). The image capturing unit 204 is, for example, an image sensor, such as a charge-coupled device (CCD) sensor or a complementary metal-oxide semiconductor (CMOS) sensor, which has a Bayer array structure in which red, green, blue (RGB) pixels are regularly arranged. The shutter 203 may be a mechanical shutter, or an electronic shutter that controls an accumulation time by controlling a reset timing for the image sensor.

Alternatively, if the image capturing unit 204 has a structure in which a plurality of photoelectric conversion units can be provided in one pixel so that a stereoscopic image can be acquired, the image capturing unit 204 can rapidly perform auto-focusing (AF) processing.

Figure 3:
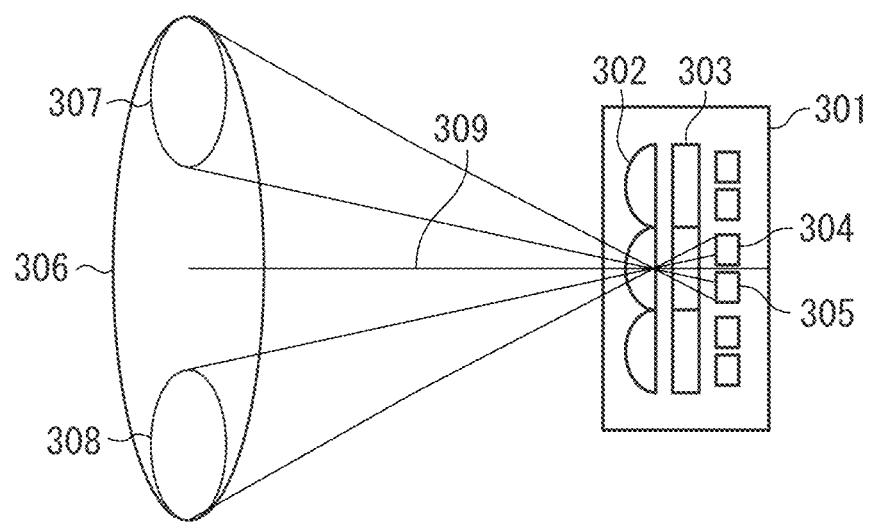
FIG. 3 is an explanatory diagram illustrating a state where an optical signal enters a pixel including a plurality of photoelectric conversion units according to an exemplary embodiment of the present disclosure.

FIG. 3 is an explanatory diagram illustrating a state where an optical signal enters a pixel including a plurality of photoelectric conversion units according to the present exemplary embodiment.

Referring to FIG. 3, a pixel array 301 includes a micro lens 302, a color filter 303, and photoelectric conversion units 304 and 305. The photoelectric conversion units 304 and 305 belong to the same pixel and correspond to one common micro lens 302 and one common color filter 303. FIG. 3 is a top view of the digital camera 100 as viewed from above and illustrates that the two photoelectric conversion units 304 and 305 corresponding to one pixel are arranged side by side. Among light beams output from an exit pupil 306, an upper light beam (corresponding to a light beam from an area 307) with respect to an optical axis 309 enters the photoelectric conversion unit 305, and a lower light beam (corresponding to a light beam from an area 308) with respect to an optical axis 309 enters the photoelectric conversion unit 304. In other words, the photoelectric conversion units 304 and 305 receive light beams from different areas of the exit pupil 306 of the imaging lens 202. Assuming herein that a signal received by the photoelectric conversion unit 304 is referred to as an image A and a signal received by the photoelectric conversion unit 305 is referred to as an image B, a defocus amount can be calculated based on a phase difference between a pair of pupil-divided images, such as the image A and the image B, and thus range information can be acquired. In particular, when pixels each including two photoelectric conversion units are arranged on the entire area of the image sensor, the image sensor can obtain range information about an object at any position on a screen.

The range information described above can also be obtained using an image sensor including normal pixels, instead of using the image sensor including pixels each including two photoelectric conversion units. For example, the image capturing unit 204 generates a plurality of images having different in-focus positions while changing relative positions of a plurality of lenses. An image processing unit 206 to be described below divides each image into blocks and calculates a contrast of each of the divided blocks. The image processing unit 206 compares the contrasts of the blocks located at the same position in the plurality of captured images, and determines a block with a highest contrast to be a block in focus. Lastly, the image processing unit 206 may obtain range information about each block from the in-focus position of the image in which the in-focus block is captured.

The digital camera 100 also includes an analog-to-digital (A/D) converter 205, an image processing unit 206, a memory control unit 207, a digital-to-analog (D/A) converter 208, a memory 209, and the system control unit 210. An analog signal is output from the image capturing unit 204 to the A/D converter 205, and the A/D converter 205 converts the acquired analog signal into image data, which may be a digital signal, and outputs the image data to the image processing unit 206 or the memory control unit 207.

The image processing unit 206 performs correction processing, such as pixel interpolation and shading correction, white balance processing, γ correction processing, color conversion processing, and the like on the image data acquired from the A/D converter 205, or on the data acquired from the memory control unit 207. Further, the image processing unit 206 performs image cut-out processing or zooming processing to thereby implement an electronic zoom function. Furthermore, the image processing unit 206 performs predetermined calculation processing using image data of captured images, and the system control unit 210 performs exposure control or ranging control based on the calculation result thus obtained. For example, the system control unit 210 performs AF processing, automatic exposure (AE) processing, or electronic flash pre-emission (EF) processing using a through-the-lens (TTL) system. The image processing unit 206 performs predetermined calculation processing using image data of captured images, and the system control unit 210 performs automatic white balance (AWB) processing of the TTL system using the obtained calculation result.

The image processing unit 206 may include an image combining processing circuit that combines a plurality of images into a panoramic image and determines the combining processing result. The image combining processing circuit is capable of performing not only simple weighted average composition processing, but also processing such as comparison lighten composition or comparison darken composition for generating image data for one image by selecting a pixel having a highest brightness value or a lowest brightness value in each area of the image data to be combined. In addition, the image processing unit 206 may evaluate and determine the combining processing result based on a specific criterion. For example, if the number of combined images is less than a predetermined number, or if the length of the composition image is less than a reference value, the image combining processing circuit may determine that the combining processing is unsuccessful. Instead of using the configuration including the image processing unit 206, the function of the image combining processing may be implemented by software processing to be performed by the system control unit 210.

The image data output from the A/D converter 205 may be written into the memory 209 through the image processing unit 206 and the memory control unit 207, or through the memory control unit 207. The memory 209 may also function as an image display memory (video memory) that stores image data to be displayed on the display unit 101. The memory 209 may have a storage capacity capable of storing a predetermined number of still images and panoramic images (wide-angle images) and panoramic image combining results. The memory 209 can also be used as a work area into which a program and the like read out from a nonvolatile memory 211 by the system control unit 210 is loaded.

Image display data (digital data) stored in the memory 209 may be transmitted to the D/A converter 208. The D/A converter 208 may convert the received digital data into an analog signal and supplies the converted analog signal to the display unit 101, thereby enabling display of an image on the display unit 101. The display unit 101 may be a display device, such as a liquid crystal display or an organic electroluminescence (EL) display, and may display an image based on the analog signal supplied from the D/A converter 208. The image display on the display unit 101 may be turned on or off by the system control unit 210. Power consumption can be reduced by turning off the image display. Digital signals accumulated in the memory 209 from the image capturing unit 204 through the A/D converter 205 may be converted into analog signals by the D/A converter 208, and the analog signals may be sequentially displayed on the display unit 101, which makes it possible to implement an electronic viewfinder function of displaying a live view.

The digital camera 100 may also include the nonvolatile memory 211, a system timer 212, a system memory 213, a detection unit 215, and a flash control unit 217. The nonvolatile memory 211 may be an electrically erasable programmable read only memory (e.g. EEPROM) or the like. The nonvolatile memory 211 may store, for example, programs to be executed by the system control unit 210, and constants used for operation. Further, the nonvolatile memory 211 may include an area for storing system information and an area for storing user setting information. The system control unit 210 may read out and restores various information and settings stored in the nonvolatile memory 211 during start-up of the digital camera 100.

The system control unit 210 may include one or more processors and one or more memories, such as a central processing unit (CPU), a micro processing unit (MPU), or the like, and may execute various program codes stored in the nonvolatile memory 211, to thereby control the overall operation of the digital camera 100. The programs, constants, variables, or the like for operation, which the system control unit 210 has read from the nonvolatile memory 211, are loaded into the system memory 213. A random access memory (RAM) may be used for the system memory 213. Further, the system control unit 210 may control the memory 209, the D/A converter 208, the display unit 101, and the like, thereby performing display control. The system timer 212 may measure the time used for various control processing, or the time of a built-in clock. The flash control unit 217 may control the light emission of the flash 141 according to the brightness of the object. The detection unit 215 may include a gyroscope or a sensor, and acquires angular velocity information, orientation information, and the like about the digital camera 100. The angular velocity information may include information about an angular velocity and an angular acceleration during panoramic image capturing by the digital camera 100. The orientation information may include information about a tilt of the digital camera 100 in a horizontal direction.

The display unit 101, the operation unit 102, the controller wheel 103, the shutter button 121, the mode selection switch 104, the power switch 122, and the flash 141 illustrated in FIG. 2 are the same as those described above with reference to FIG. 1.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Various types of operation members constituting the operation unit 102 are used for, for example, selecting various function icons to be displayed on the display unit 101. When a predetermined function icon is selected, the function is assigned for each scene. In other words, the operation members of the operation unit 102 operate as various function buttons. Examples of the function buttons include an end button, a back button, an image feeding button, a jump button, a narrowing-down button, an attribute change button, and a DISP button. For example, when a menu button is pressed, a menu screen for performing various settings is displayed on the display unit 101. A user can intuitively perform a setting operation using the menu screen displayed on the display unit 101, a four-way operational button indicating up, down, right, and left directions, and a SET button.

The controller wheel 103, which is an operation member that can be rotationally operated, is used, for example, when an option item is designated together with the four-direction button. When the controller wheel 103 is rotationally operated, an electric pulse image corresponding to an operation amount (a rotation angle, the number of rotations, etc.) is generated. The system control unit 210 analyzes the pulse signal and controls each unit of the digital camera 100.

The shutter button 121 includes a first switch SW1 and a second switch SW2. The first switch SW1 is turned on when the shutter button 121 is in the middle of the operation, or in a half-pressed state. As a result, a signal for instructing image capturing preparation is transmitted to the system control unit 210. Upon receiving the signal indicating that the first switch SW1 is turned on, the system control unit 210 starts an operation such as AF processing, AE processing, AWB processing, or EF processing. The second switch SW2 is turned on when the shutter button 121 is in a full-pressed state in which the operation of the shutter button 121 is completed. As a result, a signal for instructing to start image capturing is transmitted to the system control unit 210. Upon receiving the signal indicating the second switch SW2 is turned on, the system control unit 210 performs a series of image capturing operations from the operation of reading out a signal from the image capturing unit 204 to the operation of writing image data into the storage medium 130.

The mode selection switch 104 is a switch for switching the operation mode of the digital camera 100 between various modes such as a still image capturing mode, a moving image capturing mode, and a playback mode. The still image capturing mode includes not only an automatic image capturing mode, but also a panoramic image capturing mode for combining panoramic images by panoramic image capturing.

The digital camera 100 may also include a power supply unit 214 and a power supply control unit 218. The power supply unit 214 may be, for example, a primary battery such as an alkaline battery, a lithium battery, or the like, a secondary battery such as a NiCd battery, a NiMH battery, a Li battery, or the like, or an AC adapter. The power supply unit 214 supplies power to the power supply control unit 218. The power supply control unit 218 detects the presence or absence of attachment of a battery, the type of the battery, a remaining battery level, and the like in the power supply unit 214, and supplies a voltage to the units including the storage medium 130 for a period of time based on the detection result and an instruction from the system control unit 210.

The digital camera 100 includes a storage medium interface (I/F) 216 that enables communication between the storage medium 130 and the system control unit 210 when the storage medium 130 is attached in the storage medium slot (not illustrated). The storage medium 130 has been described in detail above with reference to FIG. 1, and thus the description thereof is herein omitted.

Next, focus stacking (focus bracketing) will be briefly described.

FIGS. 4A to 4D each illustrate a state where an object image is formed on an image forming plane according to the present exemplary embodiment.

Figure 4A:
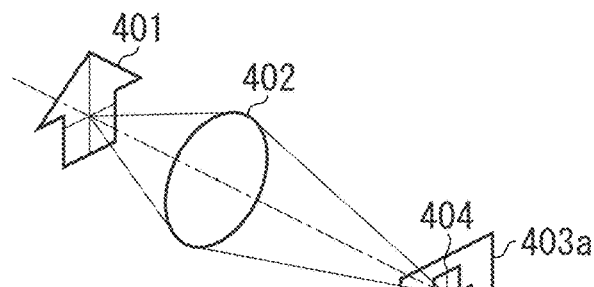
FIGS. 4A, 4B, 4C, and 4D each illustrate a state where an object image is formed on an image forming plane according to an exemplary embodiment of the present disclosure.

FIG. 4A illustrates a state where an image 404 of an object 401 is focused on a plane 403a by an optical lens 402. Specifically, if the plane 403a matches an image capturing sensor plane of the image sensor, the image of the object 401 is formed as a "point" on the plane 403a and recorded as an in-focus image.

Figure 4B:
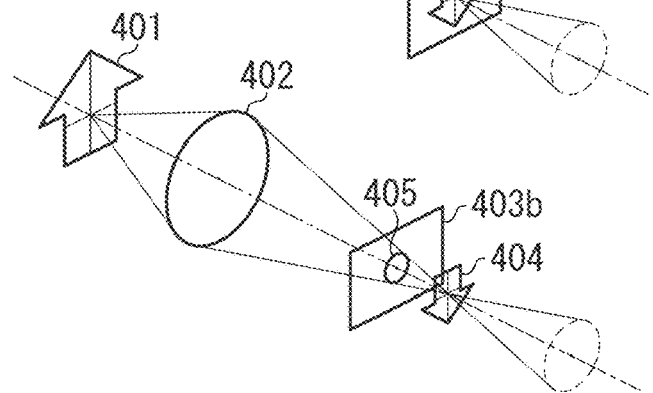

FIG. 4B illustrates a state where the image forming plane of the image does not match the image capturing sensor plane. When an image capturing sensor plane 403b is located at a position different from that of the plane 403a illustrated in FIG. 4A, the image of the object 401 that is formed by the optical lens 402 is reflected on the image capturing sensor plane 403b as a circle of confusion 405. In this case, when the circle of confusion 405 is smaller than a permissible circle of confusion of an image capturing sensor, the circle of confusion 405 can be deemed to be equivalent to a "point" in an in-focus state. As a result, an image equivalent to an in-focus image can be obtained. On the other hand, when the circle of confusion 405 is larger than the permissible circle of confusion, a blurred image is obtained on the image capturing sensor plane 403b.

Figure 4C:
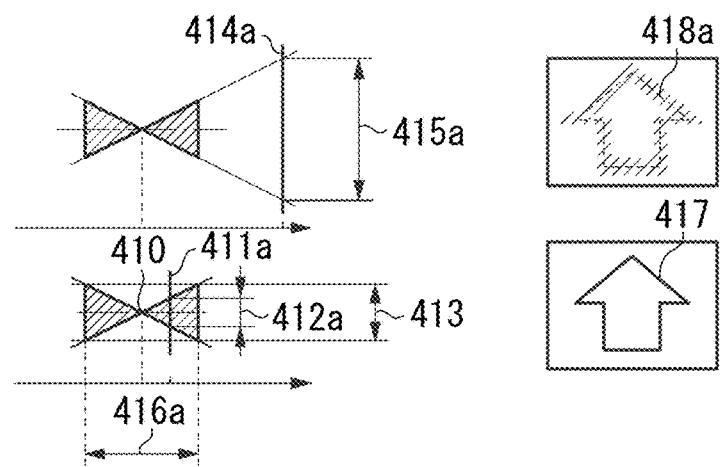

FIG. 4C illustrates the above-described state when viewed from the side. When the image of the object is formed at a focal point 410 and the image capturing sensor plane is present at a position of a plane 411a, a confusion circle diameter 412a is obtained. In this case, the confusion circle diameter 412a is smaller than a permissible confusion circle diameter 413 of the image capturing sensor. Accordingly, an image 417 that is recorded by the image capturing sensor is an in-focus image with no blur. On the other hand, when the image capturing sensor plane is present at a position of a plane 414a, a confusion circle diameter 415a is larger than the permissible confusion circle diameter 413. Accordingly, an image 418a that is formed on the image capturing sensor plane 414a is a blurred image. The shaded area, in a case in which the confusion circle diameter 412a is smaller than the permissible confusion circle diameter 413, has a focal depth 416a. A value converted from and replaced with the focal depth 416a on the object side corresponds to a depth of field.

Figure 4D:
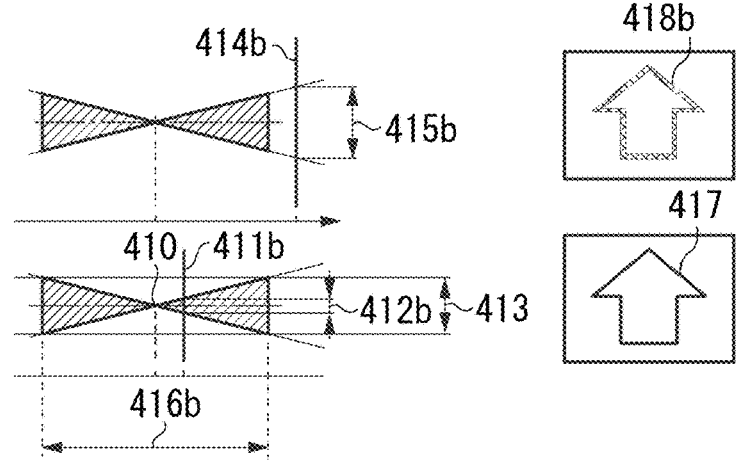

FIG. 4D illustrates a state where an aperture is further closed compared to the state of FIG. 4C. In the state where the aperture is further closed, the confusion circle diameters 412a and 415a illustrated in FIG. 4C are changed to a confusion circle diameter 412b with respect to a plane 411b and a confusion circle diameter 415b with respect to a plane 414b, respectively. In this case, the confusion circle diameter 415b illustrated in FIG. 4D is smaller than the confusion circle diameter 415a illustrated in FIG. 4C. Accordingly, an image 418b that is obtained in this case is an image with less blurring than the image 418a. A focal depth 416b obtained in this case is deeper than the focal depth 416a.

Figure 5:
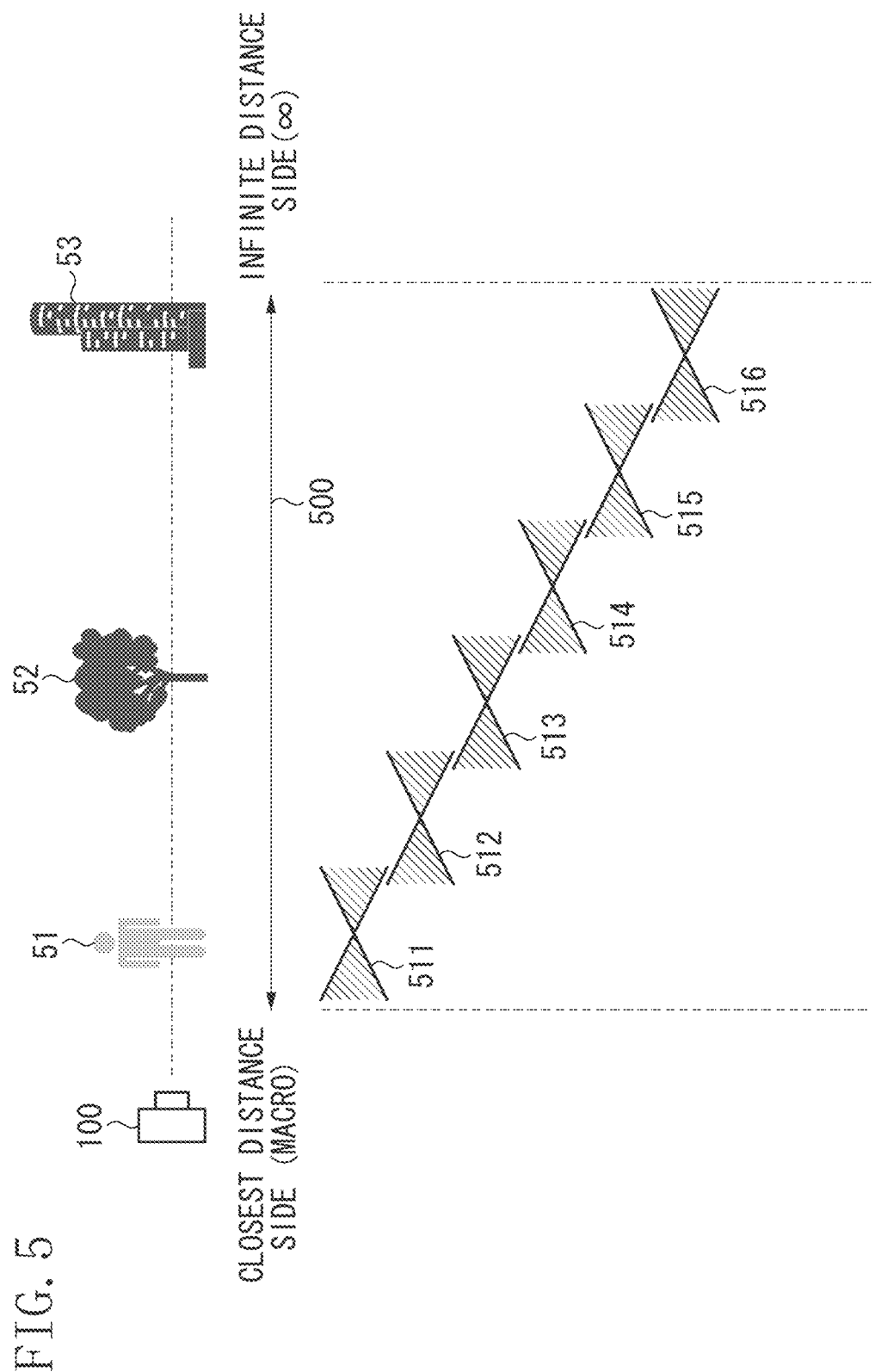
FIG. 5 is an explanatory diagram illustrating image capturing by focus stacking according to an exemplary embodiment of the present disclosure.

FIG. 5 is an explanatory diagram illustrating image capturing processing by focus stacking according to the present exemplary embodiment. Assume herein that objects 51 to 53 are set as objects to be brought into an in-focus state. The objects 51 to 53 are present at different distances (object distances) and the objects 51, 52, and 53 are located in this order in a direction from the side closest to the digital camera 100 (in a direction from a short-distance side to a long-distance side). In terms of the structure of the digital camera 100, it may be difficult to include all the objects 51 to 53 in the depth of field by one image capturing operation. To obtain a higher perceived resolution, the depth of field of each image may be reduced. In such a case, to obtain a focus-stacked image in which all of the plurality of objects 51 to 53 are in focus, a focusing range 500 (bracket range) may be covered for performing image capturing by focus bracketing with a plurality of focal depths. Focal depths 511 to 516 indicate focal depths in image capturing operations and are arranged so as to cover the focusing range 500. Specifically, if image capturing operations (six image capturing operations) are performed at in-focus positions corresponding to the focal depths 511 to 516, respectively, the objects 51 to 53 within the focusing range 500 are in the in-focus state in any one of the images. In the plurality of images captured as described above, an image in which the entire area (entire bracket range) of the focusing range 500 is in focus can be obtained by combining images in areas within the focal depth in each image capturing operation.

However, as described above, in image capturing by focus stacking, a large number of images are captured to obtain a combined image with a high image quality. Accordingly, if a difference in in-focus position between the images is extremely small, a change between the images is extremely small, which may make it difficult to detect a conversion coefficient with a high accuracy. To solve such a problem, in the present exemplary embodiment, when the system control unit 210 determines that the depth of field is shallower than a predetermined threshold, the system control unit 210 causes the image capturing unit 204 to capture an image for detecting a feature point, in addition to images to be combined.

Figure 6:
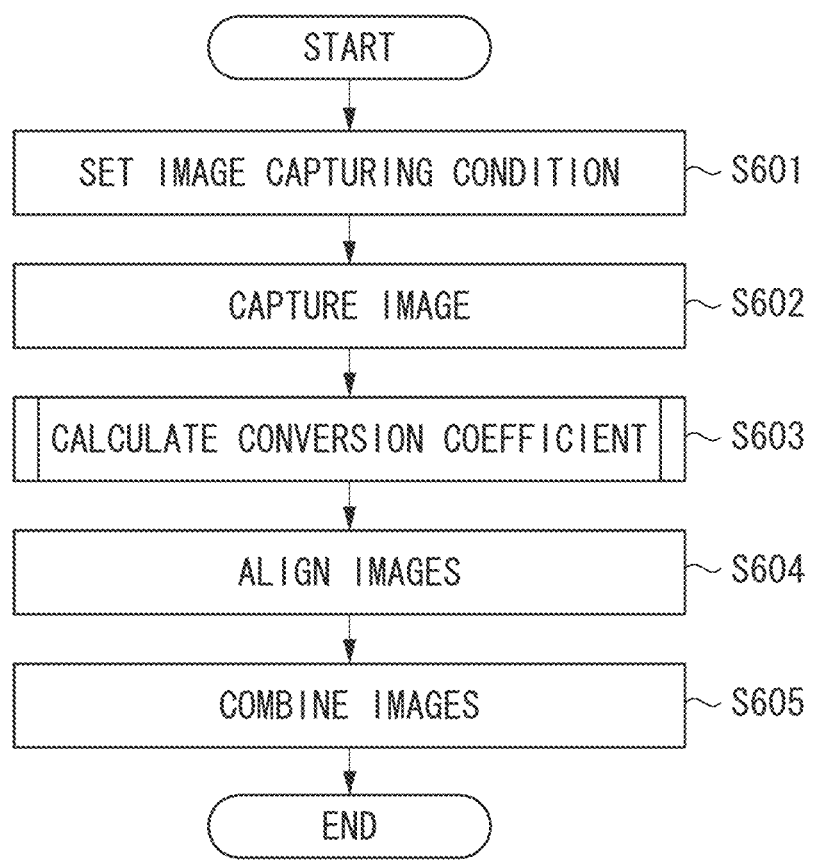
FIG. 6 is a flowchart illustrating image combining processing according to an exemplary embodiment of the present disclosure.

FIG. 6 is a flowchart illustrating image composition processing according to the present exemplary embodiment.

In step S601, the system control unit 210 sets image capturing conditions according to an input by the user or a default setting. The image capturing conditions described herein include the number of images to be combined and an in-focus position. For example, the user designates a focus position through a touch panel, which is combined with the display unit 101, and also designates a plurality of in-focus positions at regular intervals before and after the in-focus position corresponding to the focus position in an optical axis direction. Alternatively, the user may designate two positions through the touch panel, which is combined with the display unit 101, and may set in-focus positions at regular intervals between these two positions. The system control unit 210 may increase the number of in-focus positions (the number of images to be combined) in consideration of a processing load. In general, as the number of in-focus positions increases, the image quality of the focus stacked image increases. However, there is a need to determine the number of in-focus positions in consideration of a processing load. At the same time, the system control unit 210 determines the order of image capturing according to the order of distances at the set in-focus positions.

In step S601, the system control unit 210 sets a depth of field for image capturing according to the in-focus position. As illustrated in FIG. 5, the depth of field may be set so as to cover the entire bracket range.

In step S601, the system control unit 210 also sets an ISO sensitivity, a shutter speed, and the like, in addition to the in-focus position and the depth of field.

In step S602, the image capturing unit 204 sequentially captures images to be combined with respect to the same angle of view at the set in-focus position.

In step S603, the system control unit 210 calculates a conversion coefficient for alignment. The calculation will be described in detail below.

In step S604, the system control unit 210 performs alignment of images used for image combining processing. For example, the system control unit 210 can perform the alignment processing using a formula for an affine coefficient as shown in Formula 1. The affine coefficient is a typical type of coefficient used in image alignment processing, to realize linear transformation. However, the affine coefficient is just one of various types of coefficient which can be used in this embodiment, and other types of coefficient, by where the alignment processing can be realized can be used in this embodiment also.

$$I' = \begin{pmatrix} x' \\ y' \\ 1 \end{pmatrix} = AI = \begin{pmatrix} a & b & c \\ d & e & f \\ 0 & 0 & 1 \end{pmatrix} \cdot \begin{pmatrix} x \\ y \\ 1 \end{pmatrix} \quad (1)$$

In Formula 1, (x', y') represents coordinates obtained after the alignment processing is performed, and (x, y) represents coordinates obtained before the alignment processing is performed. A matrix A indicates a conversion coefficient.

In step S605, the system control unit 210 performs combining processing on the aligned images. In the combining processing, the system control unit 210 extracts and combines focus positions of the images, thereby generating a combined image in which the entire image is in focus.

When the image sensor including pixels each including a plurality of photoelectric conversion units as illustrated in FIG. 3 is used, the digital camera 100 can extract a focus position from a pupil-divided optical signal. The digital camera 100 including only a general image sensor extracts a position with a highest contrast value as a focus position.

First, the system control unit 210 calculates a contrast value for each image. As a method for calculating the contrast value, for example, the system control unit 210 calculates a luminance Y using Formula 2 based on color signals Sr, Sg, and Sb of the respective pixels.

$$Y = 0.299Sr + 0.587Sg + 0.114Sb \quad (2)$$

Next, as shown in Formulas 3 to 5 described below, a contrast value I is calculated using a Sobel filter as a matrix L for the luminance Y of 3×3 pixels.

$$I_h = \begin{pmatrix} -1 & 0 & 1 \\ -2 & 0 & 2 \\ -1 & 0 & 1 \end{pmatrix} \cdot L \quad (3)$$

$$I_v = \begin{pmatrix} -1 & -2 & -1 \\ 0 & 0 & 0 \\ 1 & 2 & 1 \end{pmatrix} \cdot L \quad (4)$$

$$I = \sqrt{I_h^2 + I_v^2} \quad (5)$$

Next, the system control unit 210 selects a pixel having a highest contrast value from the pixels of the images having the same coordinates, and replaces the pixel at the same coordinates of the combined image by the pixel having the highest contrast value. The system control unit 210 performs the replacement processing on all pixels, thereby making it possible to generate a combined image in which the entire imaging area is in focus.

The composition processing described above is, however, merely an example, and the present exemplary embodiment can also be applied to combining processing other than the combining processing for generating a combined image in which the entire imaging area is in focus. For example, the system control unit 210 may perform adding composition processing, weighted adding composition processing, comparison lighten composition processing, comparison darken composition processing, and the like.

The calculation of the conversion coefficient in step S603 will be described in detail below.

Figure 7:
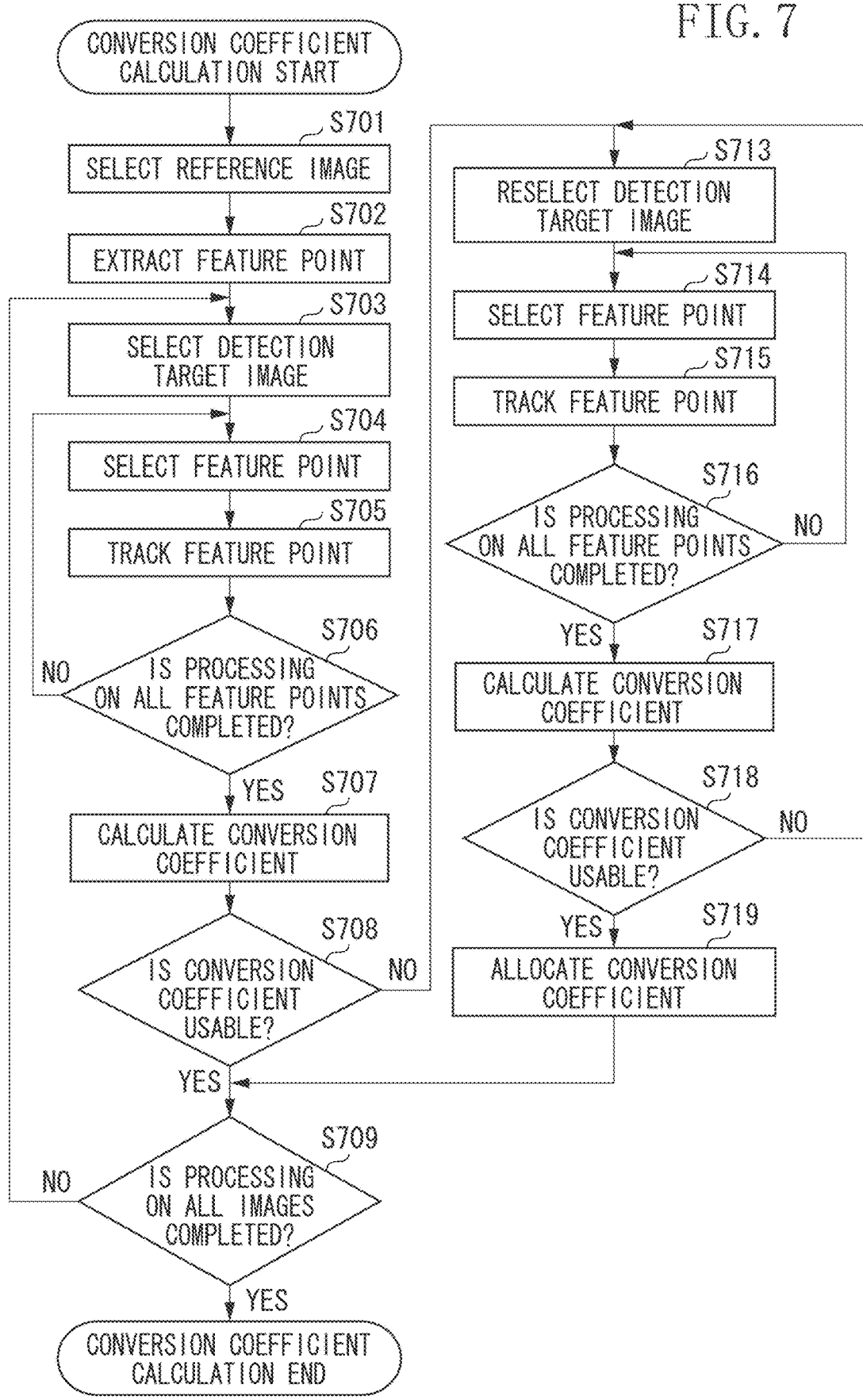
FIG. 7 is a flowchart illustrating a calculation of a conversion coefficient according to an exemplary embodiment of the present disclosure.

FIG. 7 is a flowchart illustrating the calculation of the conversion coefficient according to the present exemplary embodiment.

In step S701, the system control unit 210 selects a reference image from the images captured by the image capturing unit 204 in step S602.

In step S702, the system control unit 210 extracts a feature point from the reference image. There are various methods for extracting a feature point. For example, when a standard deviation of luminance within a predetermined area centered on a certain point is equal to or greater than a predetermined value, the system control unit 210 extracts the point as a feature point. As the number of extracted features increases, the processing accuracy increases. At the same time, however, the processing load also increases. Accordingly, it is preferable to determine the number of feature points in advance depending on the performance of hardware such as the system control unit 210.

In step S703, the system control unit 210 selects a detection target image from images other than the reference image.

In step S704, the system control unit 210 selects one of untracked feature points in the reference image.

In step S705, the system control unit 210 tracks the feature point. The system control unit 210 searches for the point corresponding to the feature point selected in step S704 in the detection target image selected in step S703. As a search method, for example, the system control unit 210 sets, as a search range, a predetermined range centered on the same position as the feature point selected in step S704 in the detection target image. The system control unit 210 calculates the corresponding point where the Sum of Absolute Difference (hereinafter referred to as "SAD") of luminance from the feature point is minimum in the search range. The memory 209 stores the correspondence relationship between the feature point and the corresponding point as a point corresponding to the feature point before execution of image deformation processing to be described below. The system control unit 210 may use Sum of Squared Difference (hereinafter referred to as "SSD"), Normalized Cross Correlation (hereinafter referred to as "NCC"), and the like, in addition to SAD, in the calculation of the corresponding point described above.

For example, assume that coordinates at three corresponding points before and after tracking are represented by (x1, y1) and (u1, v1), (x2, y2) and (u2, v2), and (x3, y3) and (u3, v3), respectively. The affine coefficient can be calculated by solving Formulas 6 and 7 described below as simultaneous equations.

$$\begin{pmatrix} x1 & y1 & 1 \\ x2 & y2 & 1 \\ x3 & y3 & 1 \end{pmatrix} \begin{pmatrix} a \\ b \\ c \end{pmatrix} = \begin{pmatrix} u1 \\ u2 \\ u3 \end{pmatrix} \tag{6}$$

$$\begin{pmatrix} x1 & y1 & 1 \\ x2 & y2 & 1 \\ x3 & y3 & 1 \end{pmatrix} \begin{pmatrix} d \\ e \\ f \end{pmatrix} = \begin{pmatrix} v1 \\ v2 \\ v3 \end{pmatrix} \tag{7}$$

The system control unit 210 normalizes feature points by a least squares method when four or more feature points whose loci are not linearly arranged are present. When the system control unit 210 cannot detect three feature points whose loci are not linearly arranged, the system control unit 210 determines that the affine coefficient cannot be calculated and thus the conversion coefficient is not usable in step S708 to be described below.

In step S706, the system control unit 210 determines whether tracking of all feature points in the reference image is performed on the detection target image selected in step S703. If the processing on all feature points in the reference image is not completed (NO in step S706), the processing returns to step S704 to select a feature point to be tracked again from unprocessed feature points. If the processing on all feature points in the reference image is completed (YES in step S706), the processing proceeds to step S707.

In step S707, the system control unit 210 calculates a conversion coefficient based on the position of the tracked feature point. The conversion processing described herein indicates one or more conversion methods selected from known methods including parallel movement, rotational movement, enlargement or reduction. In general, the system control unit 210 calculates, as a conversion coefficient, a coefficient for performing conversion processing within a shortest distance so that the positions of the corresponding points (the feature point and the point corresponding to the feature point in the detection target image) detected in step S605 match each other.

In step S708, the system control unit 210 determines whether the conversion coefficient calculated in step S707 is usable for alignment. As described above, in a case where the difference between in-focus positions during image capturing is small and a change between images is extremely small, the distance between the feature point tracked in step S705 and the feature point in the reference image is extremely small. If the conversion coefficient is detected from such a feature point, there is a possibility that the conversion coefficient may be extremely small or zero. The system control unit 210 cannot achieve the alignment processing with a high accuracy when such an extremely small conversion coefficient is used for alignment, so that the system control unit 210 determines that the conversion coefficient is not usable. Specifically, for example, when an affine coefficient is used as the conversion coefficient, the following Formula 8 is established assuming that coordinates obtained before conversion processing are represented by (x, y) and coordinates obtained after conversion processing are represented by (x', y'). Formula 8 and Formula 1 are substantially the same.

$$\begin{pmatrix} x' \\ y' \end{pmatrix} = \begin{pmatrix} a & b \\ d & e \end{pmatrix} \begin{pmatrix} x \\ y \end{pmatrix} + \begin{pmatrix} c \\ f \end{pmatrix} \tag{8}$$

In Formula 8, as the elements "a" and "e" are closer to "1", or as the elements "b", "d", "c", and "f" are closer to "0", a change in the coordinates before and after the conversion processing is small. The system control unit 210 compares the difference between the elements "a" and "e" and "1" with a threshold and compares the difference between the elements "b", "d", "c", and "f" and "0" with another threshold, thereby making it possible to determine whether the conversion coefficient is usable. Further, the system control unit 210 may determine the thresholds in advance for the respective elements described above.

As described above, when the number of feature points which are extracted from the image and are not linearly arranged is less than three, the affine coefficient cannot be calculated, so that the system control unit 210 determines that the conversion coefficient is not usable in step S708 (NO in step S708). More preferably, when the system control unit 210 determines that a predetermined number or more feature points, i.e., three or more feature points, which are not linearly arranged, cannot be extracted in the image, the processing returns to step S703.

Alternatively, the system control unit 210 determines a change in the position of the feature point. If the difference between points obtained before and after the feature point is changed is smaller than a predetermined threshold, the system control unit 210 determines that the conversion coefficient is not usable. In this case, the system control unit 210 does not need necessarily calculate the conversion coefficient before determining whether the conversion coefficient is usable.

In step S708, if the system control unit 210 determines that the conversion coefficient calculated in step S707 is not usable (NO in step S708), the conversion coefficient for alignment of the detection target image selected in step S703 will be calculated from the conversion coefficient in other detection target images. If the conversion coefficient calculated in step S707 is not usable (NO in step S708), the processing proceeds to step S713 and the system control unit 210 reselects a detection target image. As the in-focus positions are closer to each other between images, the difference between the images is smaller. Accordingly, in step S713, the system control unit 210 reselects, as a detection target image, an image of which in-focus position with respect to an in-focus position of the reference image is farther than that of the image selected in step S703.

Processing of steps S714 to S717 is similar to the processing of steps S703 to S707. In step S718, the system control unit 210 determines whether the conversion coefficient calculated in step S717 is usable. A determination method similar to that described above in step S708 may be used. In step S718, if the system control unit 210 determines that the conversion coefficient is not usable (NO in step S718), the processing returns to step S713 to reselect, as a detection target image, an image of which in-focus position with respect to the reference image is even farther than that of the previously selected image.

On the other hand, in step S718, if the system control unit 210 determines that the conversion coefficient is usable (YES in step S708), the conversion coefficient calculated in step S717 is temporarily stored in the system memory 213 as the conversion coefficient of the detection target image selected in step S713. Next, the processing proceeds to step S719 to assign the conversion coefficient of the detection target image selected in step S703 by using the conversion coefficient calculated in step S717. In this case, the system control unit 210 uses the in-focus position of the reference image and the in-focus positions of the two detection target images selected in steps S703 and S713, respectively, to assign the conversion coefficient. For example, consider the reference image as a first image and the detection target image selected in step S703 as a second image. In a case where the conversion coefficient of the second image with respect to the first image, which is calculated in step S707 using the feature points detected from the first image and the second image, is not usable, the processing proceeds to step S713 and the system control unit 210 reselects a third image as a detection target image. Processing of steps S714 to S717 is similar to the processing of steps S703 to S707. In step S718, the system control unit 210 determines whether the conversion coefficient calculated in step S717 is usable. If the system control unit 210 determines that the conversion coefficient is usable (YES in step S708), the conversion coefficient in step S717 is temporarily stored in the system memory 213 as the conversion coefficient of the third image, e.g. the detection target image selected in step S713. Next, the processing proceeds to step S719 to assign the conversion coefficient of the second image, e.g. the target image selected in step S703, by using the conversion coefficient calculated in step S717. In this case, the system control unit 210 uses the in-focus position of the first image, e.g. the reference image, and the in-focus positions of the second image and third image, e.g. the two detection target images selected in steps S703 and S713. In other words, the conversion coefficient of the second image with respect to the first image may be calculated based on the feature points detected from the first image, the second image, and a third image in the plurality of images in a case where the conversion coefficient of the second image with respect to the first image, which is calculated using the feature points detected from the first image and the second image, does not satisfy a predetermined condition.

A specific assigning method in which the affine coefficient is assigned to an image captured at an in-focus position p3 between in-focus positions p1 and p2 of two images for which the affine coefficient can be calculated will be described by way of example. Assume that the affine coefficient to be assigned to the image captured at the in-focus position p1 is represented by $A_1$, the affine coefficient to be assigned to the image captured at the in-focus position p2 is represented by $A_2$, and the affine coefficient to be assigned to the image captured at the in-focus position p3 is represented by $A_3$. The following Formula 9 is established assuming that the affine coefficient to be assigned to the image captured at the in-focus position p2 is represented by $A_{21}$ based on the image captured at the in-focus position p1.

$$A_2 = A_{21} \cdot A_1 \tag{9}$$

The affine coefficient $A_{21}$ can be solved by calculating an inverse matrix $A_1$ from Formula 9. Further, an affine coefficient $A_{31}$ to be assigned to the image captured at the in-focus position p3 based on the image captured at the in-focus position p1 can be calculated using the positional relationship among the in-focus positions p1, p2, and p3. For example, if the in-focus position p3 is located exactly in the middle of the in-focus positions p1 and p2, the elements "a" to "f" of the affine coefficient $A_{31}$ are half as much as the elements of the affine coefficient $A_{21}$. Lastly, the affine coefficient $A_3$ is assigned to the image captured at the in-focus position p3 by using the following Formula 10.

$$A_3 = A_{31} \cdot A_1 \tag{10}$$

In step S709, the system control unit 210 determines whether the conversion coefficient calculation processing on all images other than the reference image is completed. If the processing on all images is not completed (NO in step S709), the processing returns to step S703.

While the exemplary embodiments of the present disclosure have been described above, the present disclosure is not limited to the exemplary embodiments described above. The present disclosure can be carried out in various modified forms. In particular, the following implementation methods can be considered. In addition to the images captured in step S602 by the image capturing unit 204, images exclusively used for calculation of the conversion coefficient are also captured. The images exclusively used for calculation of the conversion coefficient are obtained by, for example, capturing images at in-focus positions on a closest distance side and an infinite distance side in the focusing range of the digital camera 100, and calculating the conversion coefficient. The system control unit 210 assigns the conversion coefficient calculated from the images exclusively used for calculation of the conversion coefficient to the images to be combined. An assigning method similar to that described above in step S719 may be used.

According to the present exemplary embodiment, in the processing for combining a plurality of images captured while finely moving the in-focus position, a conversion coefficient is calculated from images having in-focus positions which are further away from each other, instead of using adjacent images, and the conversion coefficient is assigned to another image, thereby enhancing the alignment accuracy.

Other Exemplary Embodiments

In the exemplary embodiments described above, the present disclosure is carried out as a digital camera, but the present disclosure is not limited to a digital camera. For example, the present disclosure can also be carried out as a mobile device or the like incorporating an image sensor, or as a network camera capable of capturing images.

The present disclosure can also be implemented by processing in which a program for implementing one or more functions of the exemplary embodiments described above may be supplied to a system or apparatus through a network or storage medium, and one or more processors and one or more memories in a computer of the system or apparatus can read out a program and execute the program. The present disclosure can also be implemented by a circuit (e.g., an application specific integrated circuit (ASIC)) for implementing one or more functions.

OTHER EMBODIMENTS

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors and one or more memories (e.g., central processing unit (CPU), micro processing unit (MPU), or the like), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2017-215913, filed Nov. 8, 2017, which is hereby incorporated by reference herein in its entirety.

What is claimed is:

1. An image processing apparatus comprising:
at least one memory configured to store instructions; and
at least one processor in communication with the at least one memory and configured to execute the instructions to:
detect feature points from at least a part of a plurality of images having different in-focus positions;
calculate a conversion coefficient of a second image in the plurality of images with respect to a first image in the plurality of images based on the feature points detected from the first image and the second image;
calculate the conversion coefficient of the second image with respect to the first image based on the feature points detected from the first image, the second image, and a third image in the plurality of images in a case where the conversion coefficient of the second image with respect to the first image, which is calculated using the feature points detected from the first image and the second image, does not satisfy a predetermined condition; and
perform combining processing on the at least a part of the plurality of images based on the conversion coefficient of the second image with respect to the first image.

2. The image processing apparatus according to claim 1, wherein the at least one processor executes further instructions to calculate the conversion coefficient of the second image based on the conversion coefficient of the third image in a case where the conversion coefficient of the second image with respect to the first image, which is calculated using the feature points detected from the first image and the second image, does not satisfy the predetermined condition, and the conversion coefficient of the third image with respect to the first image, which is calculated using the feature points detected from the first image and the third image, satisfies the predetermined condition.

3. The image processing apparatus according to claim 1, wherein the at least one processor executes further instructions to perform the combining processing by extracting in-focus areas from the at least a part of the plurality of images.

4. The image processing apparatus according to claim 1, wherein the at least one processor executes further instructions to determine that the predetermined condition is satisfied in a case where a magnitude of the conversion coefficient is greater than a predetermined threshold.

5. The image processing apparatus according to claim 1, wherein the at least one processor executes further instructions to determine that the predetermined condition is satisfied in a case where an element of the conversion coefficient falls within a predetermined range.

6. The image processing apparatus according to claim 5, wherein the at least one processor executes further instructions to determine that the predetermined condition is satisfied in a case where, in corresponding feature points between images used for calculation of the conversion coefficient, a number of corresponding feature points with a difference between coordinates of the corresponding feature points being larger than a predetermined threshold is equal to or more than a predetermined number.

7. The image processing apparatus according to claim 6, wherein the conversion coefficient is an affine coefficient and the predetermined number is three.

8. The image processing apparatus according to claim 1, wherein the at least one processor executes further instructions to determine that the predetermined condition is satisfied in a case where a difference between coordinates of corresponding feature points in images used for calculation of the conversion coefficient is larger than a predetermined threshold.

9. The image processing apparatus according to claim 1, wherein the at least one processor executes further instructions to determine that the predetermined condition is satisfied in a case where a difference between coordinates of all corresponding feature points in images used for calculation of the conversion coefficient is larger than a predetermined threshold.

10. The image processing apparatus according to claim 1, wherein the at least one processor executes further instructions not to use the third image for the combining processing.

11. The image processing apparatus according to claim 1, wherein an in-focus position set when the third image is captured is farther from an in-focus position set when the first image is captured than an in-focus position set when the second image is captured.

12. An image pickup apparatus comprising:
an image sensor configured to capture a plurality of images having different in-focus positions;
at least one memory configured to store instructions; and
at least one processor in communication with the at least one memory and configured to execute the instructions to:
detect feature points from at least a part of the plurality of images having the different in-focus positions;
calculate a conversion coefficient of a second image in the plurality of images with respect to a first image in the plurality of images based on the feature points detected from the first image and the second image;
calculate the conversion coefficient of the second image with respect to the first image based on the feature points detected from the first image, the second image, and a third image in the plurality of images in a case where the conversion coefficient of the second image with respect to the first image, which is calculated using the feature points detected from the first image and the second image, does not satisfy a predetermined condition; and
combine the at least a part of the plurality of images based on the conversion coefficient of the second image with respect to the first image.

13. A control method for an image processing apparatus, the method comprising:
detecting feature points from at least a part of a plurality of images having different in-focus positions;
calculating, using at least one processor, a conversion coefficient of a second image in the plurality of images with respect to a first image in the plurality of images based on the feature points detected from the first image and the second image;
calculating the conversion coefficient of the second image with respect to the first image based on the feature points detected from the first image, the second image, and a third image in the plurality of images in a case where the conversion coefficient of the second image with respect to the first image, which is calculated using the feature points detected from the first image and the second image, does not satisfy a predetermined condition; and
combining the at least a part of the plurality of images based on the conversion coefficient of the second image with respect to the first image.

14. A non-transitory computer-readable storage medium storing instructions that cause a computer to execute a method comprising:
detecting feature points from at least a part of a plurality of images having different in-focus positions;
calculating a conversion coefficient of a second image in the plurality of images with respect to a first image in the plurality of images based on the feature points detected from the first image and the second image;
calculating the conversion coefficient of the second image with respect to the first image based on the feature points detected from the first image, the second image, and a third image in the plurality of images in a case where the conversion coefficient of the second image with respect to the first image, which is calculated using the feature points detected from the first image and the second image, does not satisfy a predetermined condition; and
combining the at least a part of the plurality of images based on the conversion coefficient of the second image with respect to the first image.

* * * * *